(12) United States Patent
Maher et al.

(10) Patent No.: US 12,011,939 B2
(45) Date of Patent: Jun. 18, 2024

(54) SYSTEM FOR POSITIONING A GOLF BALL IN A HIGH SPEED PRINTING LINE

(71) Applicant: Acushnet Company, Fairhaven, MA (US)

(72) Inventors: Edmund T. Maher, Fairhaven, MA (US); Jedediah H. James, Dighton, MA (US)

(73) Assignee: Acushnet Company, Fairhaven, MA (US)

( * ) Notice: Subject to any disclaimer, the term of this patent is extended or adjusted under 35 U.S.C. 154(b) by 244 days.

(21) Appl. No.: 17/552,646

(22) Filed: Dec. 16, 2021

(65) Prior Publication Data

US 2023/0191802 A1 Jun. 22, 2023

(51) Int. Cl.
*B41J 3/407* (2006.01)
*B65G 35/06* (2006.01)

(52) U.S. Cl.
CPC .......... *B41J 3/40731* (2020.08); *B65G 35/06* (2013.01); *B65G 2201/0214* (2013.01)

(58) Field of Classification Search
CPC ...... B41J 3/40731; B65G 35/06; B65G 54/02; B65G 2201/0214
USPC .................. 198/867.01–867.9, 803.01–803.9
See application file for complete search history.

(56) References Cited

U.S. PATENT DOCUMENTS

| | | | | |
|---|---|---|---|---|
| 1,721,965 | A * | 7/1929 | McGinness | A63B 45/02 101/39 |
| 4,982,556 | A * | 1/1991 | Tisma | G07F 17/0092 53/154 |
| 10,086,626 | B1 * | 10/2018 | Herrmann | B41M 1/40 |
| 10,118,775 | B2 | 11/2018 | Walter et al. | |
| 10,328,718 | B2 * | 6/2019 | Condello | B41M 1/40 |
| 10,532,891 | B2 | 1/2020 | Walter et al. | |
| 10,913,362 | B2 | 2/2021 | Holzleitner et al. | |
| 11,161,700 | B2 | 11/2021 | Weber | |
| 2010/0186610 | A1 * | 7/2010 | Polk | B41J 3/4073 101/35 |

FOREIGN PATENT DOCUMENTS

DE 102015203798 A1 * 10/2015 ............. B41J 3/407

* cited by examiner

*Primary Examiner* — James R Bidwell
(74) *Attorney, Agent, or Firm* — Steven Landolfi, Jr.

(57) ABSTRACT

A device for transporting and positioning a golf ball has a shuttle configured to be attached to a track for movement along the track relative to a printing station. The device has a golf ball holder attached to the shuttle. The golf ball holder maintains an orientation of the golf ball. The device also has at least one plate configured to move the golf ball holder between an with respect to the shuttle and the printing station. The at least one plate enables position registration of the golf ball for printing.

16 Claims, 9 Drawing Sheets

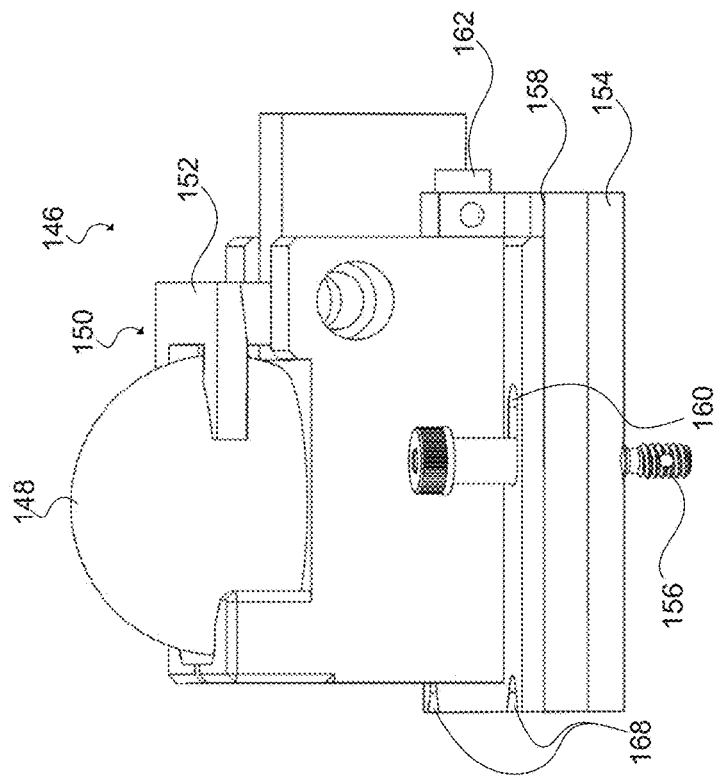
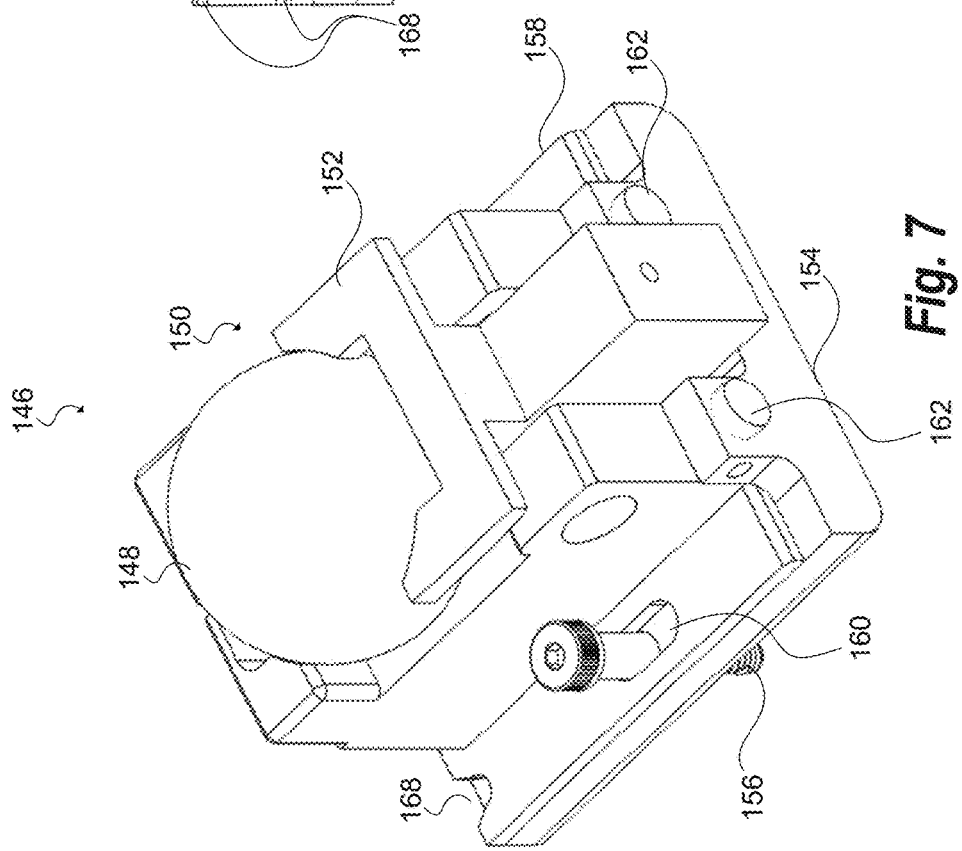

SYSTEM FOR POSITIONING A GOLF BALL IN A HIGH SPEED PRINTING LINE

FIELD OF THE INVENTION

This invention generally relates to a manufacturing and processing system for golf balls, and more particularly to a system for positioning a golf ball in a high speed manufacturing line, such as a pad printing line.

BACKGROUND OF THE INVENTION

The manufacture of golf balls typically involves a series of sequential processes performed at different processing stations, typically spatially separated one from another. These different processing stations may require manual movement of the golf balls between different stations. For example, golf balls may need to be manually moved from a processing station to a printing area and hand-fed into a printing line. Conventional automation tools have limited applicability to golf balls, because of the wide variety of markings that are printed on golf balls, often in small quantities. Different individual printing stations may require individual preparation, planning, and turnover to produce golf balls with different printed markings, such as custom logos or other indicia. The disclosed embodiments provide automation tools for improving the processing speed and efficiency of manufacturing golf balls, especially the process of printing markings on golf balls.

SUMMARY OF THE INVENTION

In some embodiments, the present disclosure includes a device for transporting and positioning a golf ball has a shuttle configured to be attached to a track for movement along the track relative to a printing station. The device has a golf ball holder attached to the shuttle. The golf ball holder maintains an orientation of the golf ball. The golf ball holder also includes at least one plate configured to move the golf ball holder with respect to the shuttle.

In another aspect, the present disclosure includes a system for transporting and processing golf balls. The system includes at least one track, a printing station adjacent to the track for printing markings on the golf ball, a shuttle configured to be attached to the track for movement along the track relative to the printing station, and a golf ball holder. The golf ball holder is attached to the shuttle. The golf ball holder maintains an orientation of the golf ball and includes at least one plate configured to move the golf ball holder with respect to the shuttle.

BRIEF DESCRIPTION OF THE DRAWINGS

FIG. 7 is a perspective view of a golf ball holder for positioning a golf ball on a shuttle, including a lock mechanism in an open position, consistent with disclosed embodiments;

FIG. 8 is another perspective view of the golf ball holder of FIG. 7, consistent with disclosed embodiments;

DETAILED DESCRIPTION OF THE INVENTION

According to disclosed embodiments, a high-speed golf ball handling and management system is disclosed for golf ball manufacturing, and, more particularly, golf ball orientation, printing, offloading, and packaging. The disclosed embodiments include a transportation system for moving a plurality of golf balls through one or more processing stations via an interconnected track system. A control system is connected with the track system and various stations to control the movement of golf-ball-transporting shuttles within the handling and management system. The shuttles may be configured to switch between the plurality of tracks based on instructions from the control system. The golf ball handling and management system includes at least one processing station, such as a printing station, that performs a manufacturing or processing task related to the golf ball.

In at least some embodiments, the control system is configured to manage a plurality of simultaneous tasks within the handling and management system. For example, the control system may be configured to control a first shuttle to arrive at a first processing station for a first processing task while simultaneously controlling a second shuttle to arrive at a second processing station for a second task. In an exemplary embodiment, the control system is configured to generate a processing plan for a golf ball and/or lot of golf balls received at an onboarding station and thereafter control the movement of multiple shuttles simultaneously to increase the throughput of the system. For example, the control system may simultaneously control different printing processes for different golf ball lots and deliver the golf balls to a packaging station for grouping and packaging of similar lots.

Further embodiments may include particularized tools and equipment for processing golf balls using the disclosed transportation system. For example, some embodiments include a golf ball holder configured to mount to a shuttle that is transported by the disclosed transportation system. The holder may include features to hold and maintain a golf ball in a desired orientation on a shuttle such that when the shuttle is delivered to a processing station, the golf ball can be processed with precision and reliability. For example, the holder may be configured to orient a golf ball to expose a portion of the golf ball for printing on the golf ball. The holder may further include features for interacting with a processing station, such as a printing station. Similarly, the processing station may include particularized features for interacting with the holder and/or shuttle.

Figure 1A:
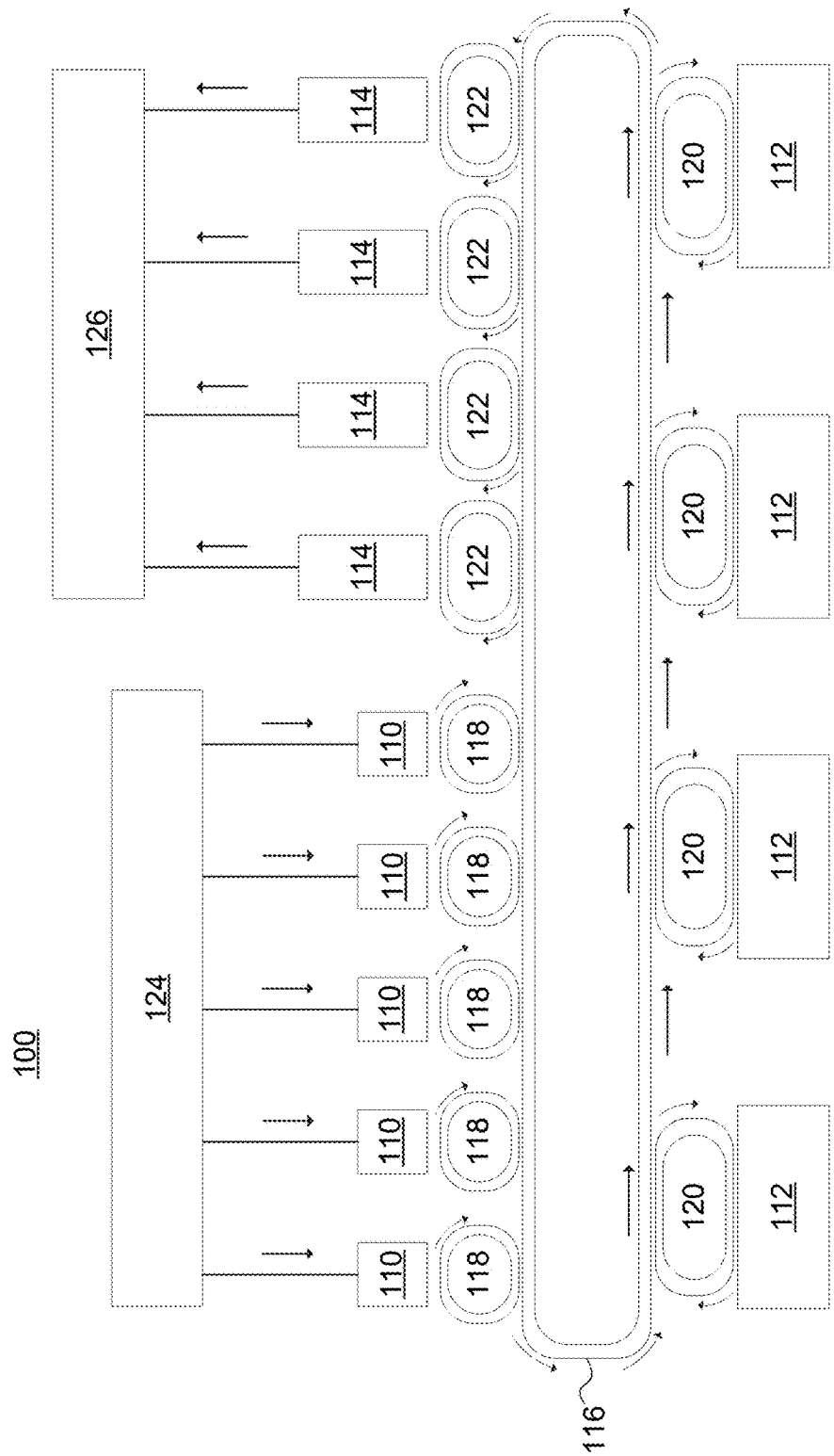
FIG. 1A is a diagram of an exemplary golf ball transportation system, consistent with disclosed embodiments.

FIG. 1A is a diagram of a golf ball transportation system 100. The system 100 is configured to transport a plurality of golf balls between a plurality of processing and/or manufacturing stations 110, 112, and 114. The plurality of stations 110, 112, and 114 are connected by primary track 116 and a plurality of station tracks 118, 120, and 122. In an exemplary embodiment, each station track 118, 120, and 122 is associated with a station 110, 112, or 114. The primary track 116 connects each of the station tracks 118, 120, 122 to each other. Each of the primary track 116 and station tracks 118, 120, 122 may be a continuous loop, but are not limited thereto. It should be understood that, as shown in the drawing, each station 110, 112, 114 may be a station grouping of a plurality of stations. For example, the stations 110 may be a group of orienting stations for each onboarding and orienting a golf ball in the system 100. The use of multiple stations in a group may add to the output and efficiency of the system 100. Similarly, each station track 118, 120, 122 may be a station track grouping of a plurality of station tracks as shown. Further, it should be understood that the illustrated configuration is merely one example and that other embodiments may include a different configuration of stations and tracks.

In an exemplary embodiment, the system 100 is configured to receive a plurality of golf balls from a golf ball delivery system 124, transport the plurality of golf balls between stations 110, 112, and 114, and output the processed golf balls though a golf ball output system 126. Within the system 100, the golf balls may move between stations 110, 112, and 114 via connections from the primary track 116. For example, a golf ball may be input at the golf ball delivery system 124, placed onto station track 118 via the station 110, transfer to the primary track 116 where it is delivered to station track 120 for processing at station 112, and transferred back to the primary track 116 before it is delivered to station track 122 for removal via station 114. In some embodiments, the golf ball is transferred to multiple stations 112 before transfer to a station track 122.

As shown in FIG. 1A, the station tracks 118, 120, and 122 have a loop configuration such that a golf ball can be transferred to the track, processed at corresponding station equipment, and looped back onto the primary track 116. Further, the station tracks 118, 120, and 122 to not physically contact the primary track 116. The transportation system 100 may be configured with equipment for inducing motion to the golf balls. The equipment may include, for example, a stator motor system such as a linear track system produced by B&R Industrial Automation GmbH and/or as described in any of U.S. Pat. Nos. 10,118,775, 10,532,891, 10,913,362, and 11,161,700, which are hereby incorporated by reference in their entirety. Other similar transportation systems may also be applicable for high-speed transportation of golf balls on a plurality of tracks.

Figure 1B:
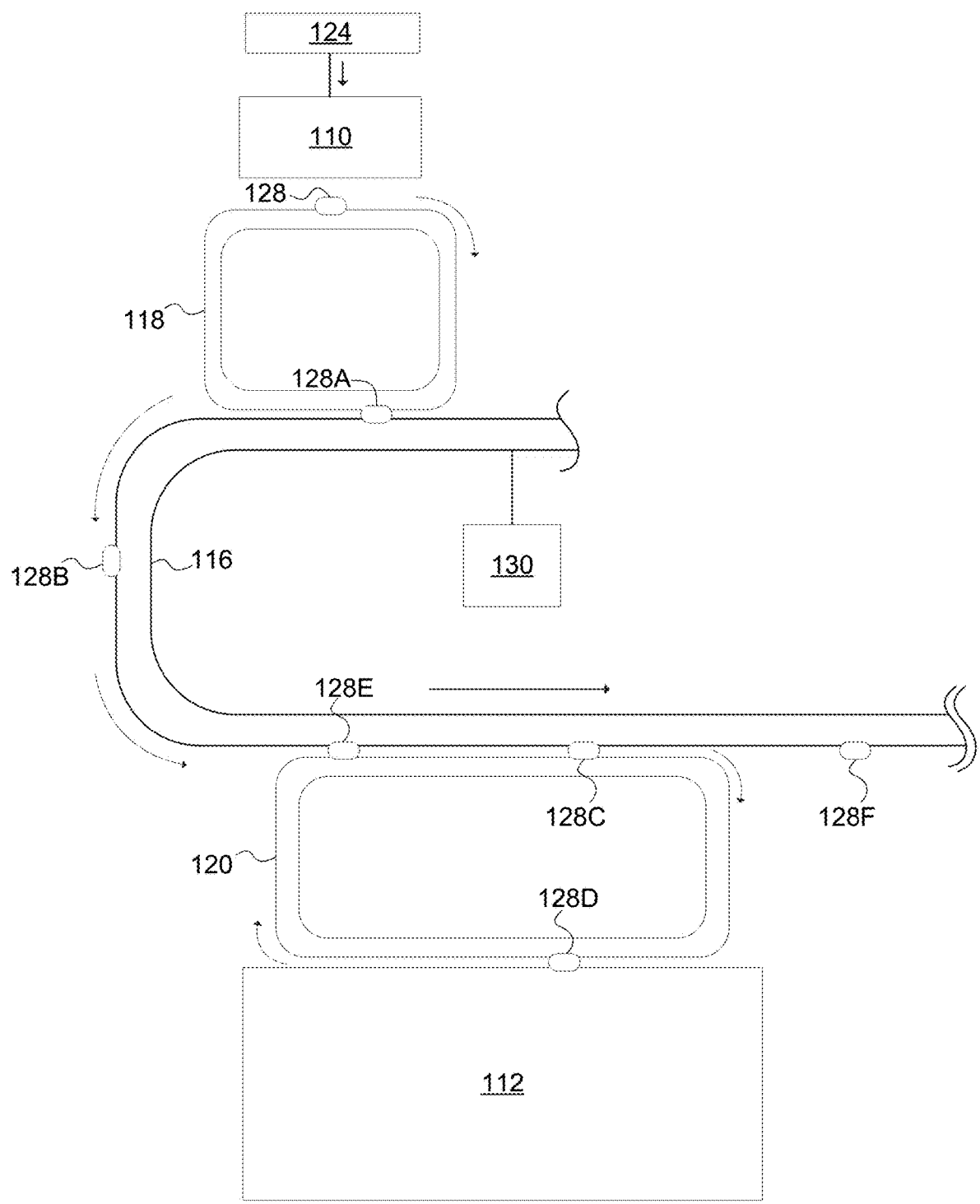
FIG. 1B is another diagram of a portion of the golf ball transportation system of FIG. 1, further depicting movement of golf ball shuttles through the system, consistent with disclosed embodiments.

FIG. 1B further illustrates a selected portion of the system 100, including the station 110 and station 112 connected by a portion of the primary track 116 and station tracks 118 and 120. In an exemplary embodiment, the system 100 further includes at least one shuttle 128. Each shuttle 128 is configured to move along the primary track 116 and each of the station tracks 118, 120, and 122. Each shuttle 128 is configured to carry at least one golf ball thereon. An exemplary embodiments of the shuttle 128 is shown and described in relation to FIGS. 5 and 6. In some embodiments, the station 110 is configured to place and orient a golf ball on a shuttle 128. In some embodiments, a control system 130 is configured to use software and power controls to selectively move the shuttle 128 (and the golf ball(s) carried thereon) throughout the system 100. The control system 130 may be, for example, a computing device having at least a processing unit and a memory storing instructions for the processing unit to execute to complete one or more processes. The control system 130 may be configured to send signals to components of the system 100 to control movement of the shuttles 128 in the system. As described, the primary track 116 does not physically contact any of the station tracks 118, 120, 122. This enables high-speed track switching by the shuttles 128, which have multiple bearing surfaces for riding on the different tracks in the system.

FIG. 1B further depicts exemplary movement of the shuttle 128 through the system 100. The shuttle 128 may start adjacent to the station 110, which may be an onboarding and/or orienting station. The station 110 may include equipment for placing a golf ball on the shuttle 128. For example, the station 110 may place the golf ball on the shuttle 128 in a selected orientation. The shuttle 128 moves around the station track 118 to the position shown at 128A, where the shuttle 128 is transferred from the station track 118 to the primary track 116. The shuttle continues along the primary track to the position shown at 128B and eventually to the position at 128C where it is transferred to the station track 120. The shuttle 128 moves around the station track 120 and is positioned at 128D for processing at the station 112 (e.g., pad printing). The shuttle 128 continues along the loop of the station track 120 until it is transferred back to the primary track 116 at the position shown at 128E. The shuttle 128 continues along the primary track 116 to the position at 128F and continues on to another processing station and/or for eventual removal of the golf ball from the system 100 by an offboarding station. As shown, the positions at 128A, 128C, and 128E are transfer positions in which the shuttle 128 comes into proximity with the primary track 116 and one of the station tracks 118, 120, 122, even though the tracks do not physically contact each other. The system 100 is thus configured to enable the shuttles 128 to perform high-speed and seamless switching between tracks according to instructions from the control system 130.

In an exemplary embodiment, the system 100 is an automated system for printing markings on a golf ball. In an exemplary embodiment, the station 112 is an orienting station configured to onboard and position a golf ball in a particular orientation on a shuttle 128. Each station 112 may be a printing station configured to print a marking on the golf ball carried by the shuttle 128. Each station 114 may be an offboarding station configured to receive a golf ball after it has been stamped and deliver the golf ball for further processing (e.g., packaging). The golf ball delivery system 124 may be configured to deliver a plurality of golf balls to the orienting stations 110 and the offboarding stations 114 may be configured to deliver the printed golf balls to the golf ball output system 126 for packaging or other processing steps. The control system 130 may be configured for high speed movement of a plurality of golf balls throughout the system 100 simultaneously. The control system 130 may be programmed with anti-collision software to ensure that a plurality of shuttles 128 can move through the system 100 smoothly and without collisions or interruptions. As a result, the system 100 is configured as a high-speed, high-throughput system for printing markings on golf balls prior to packaging and/or delivery of a final product. For example, the system 100 may achieve a processing speed of 300 balls per minute (300 printed golf balls being offloaded every minute). It should be understood, however, that printing is one example of a processing step that may be accomplished using the system 100. The system 100 may be modified and/or adapted to accomplish other golf ball and/or golf equipment processing steps in a high-speed and high-precision production line.

Figure 2:
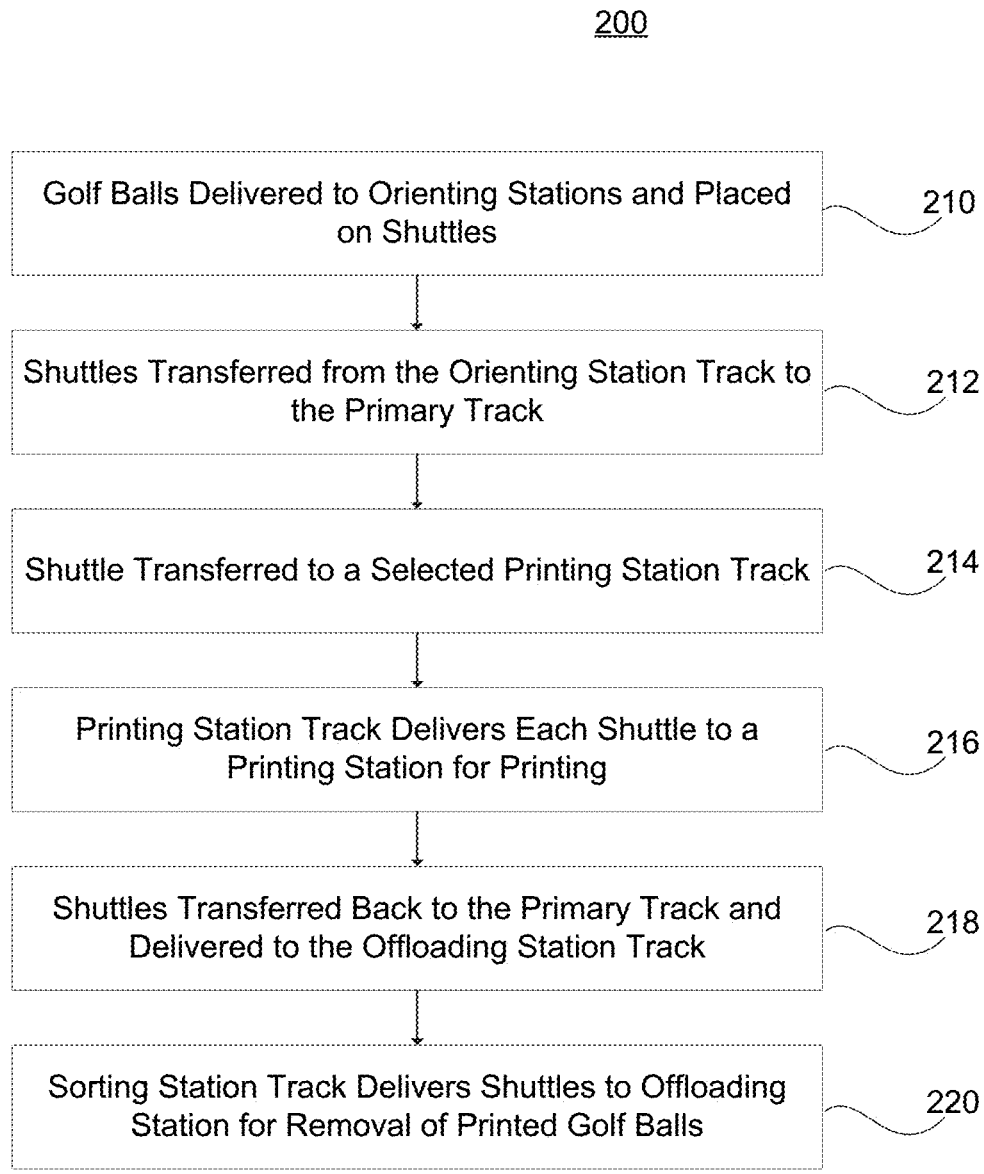
FIG. 2 is a flowchart of an exemplary process for processing a golf ball using the transportation system of FIG. 1.

FIG. 2 is a flowchart of an exemplary golf ball manufacturing process 200. The process 200 may be performed by one or more components of the system 100, such as via control system 130 executing software instructions to move golf balls on shuttles 128. In step 210, a plurality of golf balls are delivered to orienting stations 110 by the golf ball delivery system 124. The orienting stations 110 may be configured to individually place a golf ball onto a shuttle 128 in a desired orientation. The desired orientation may be a positioning of the golf ball such that printing will occur at a selected location on the golf ball. The orienting station 110 may, for example, inspect a golf ball for a dimple pattern or other distinguishing characteristic (e.g., existing printed markings such as logos, side stamps, alignment markings, etc.) in order to orient the golf ball. In an exemplary embodiment, the golf ball delivery system 124 may be a complex sorting system configured to deliver different types of golf balls to the system 100 and may provide processing orders to the control system 130 for controlling the golf balls through the system 100 and applying the appropriate steps (e.g., printing a desired marking on a particular ball and further sorting that golf ball to a desired destination).

In step 212, the shuttle 128 is moved along the station track 118 and transferred to the primary track 116. For example, the shuttle 128 may be configured to ride along a side of the station track 118 and switch to the primary track 116 via electromagnetic force attracting the opposite side of the shuttle 128 to the side of the primary track 116. The control system 130 may be configured to continuously store a location of the shuttle 128 and move the shuttle 128 along the primary track 116 to a next destination according to a desired manufacturing process.

Figure 4:
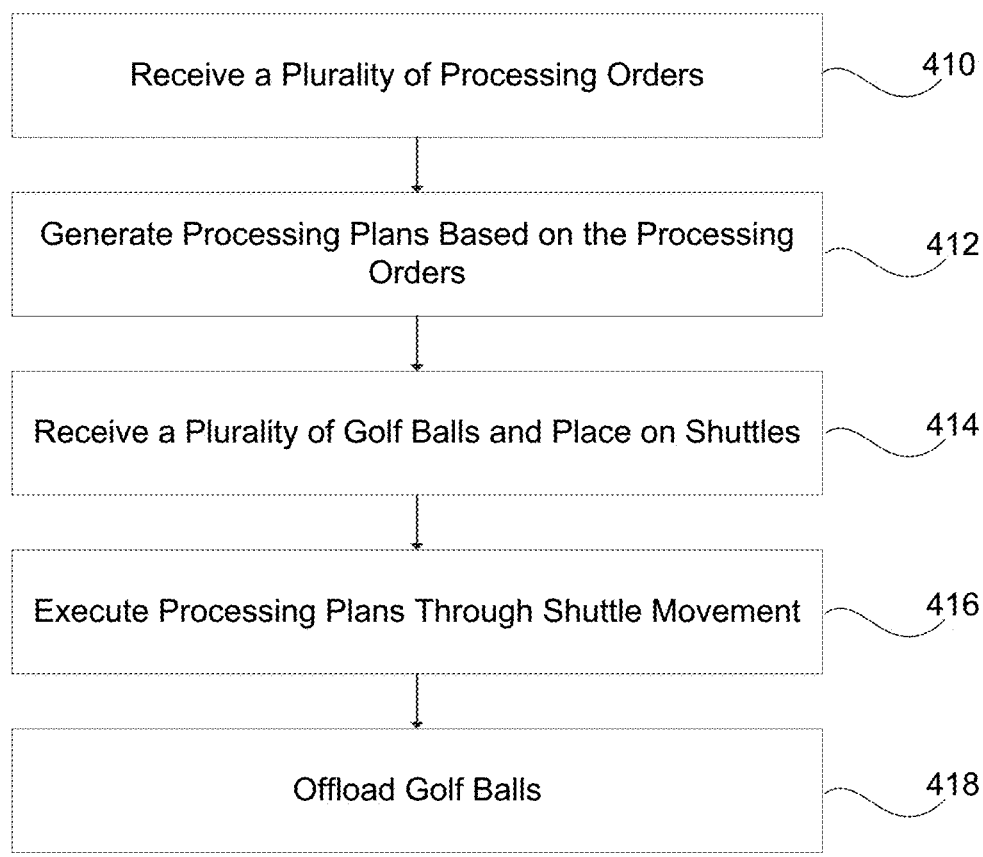
FIG. 4 is a flowchart of an exemplary process for simultaneously processing a plurality of golf balls using the transportation system of FIG. 1.

In step 214, the control system 130 instructs the system 100 to transfer the shuttle 128 to the station track 120. In step 216, the station track 120 delivers the shuttle 128 to the printing station 112 for printing on the oriented golf ball. The printing station 112 is not limited to any particular printing process and can include multiple steps for printing. For example, the printing station 112 may be configured with multiple printing and orienting steps for complex printing on the golf ball. FIG. 4 depicts an exemplary embodiment of a printing station 112 and a station track 120. A plurality of shuttles 128 are configured to move along a side of the station track 120 to deliver a plurality of golf balls 132. The printing station 112 includes a printing apparatus 134, such as a plurality of printing pads configured to stamp markings on a golf balls 132. The system 100 may be configured such that the golf balls 132 are stopped in position under the printing apparatus 134 for printing before continuing along the station track 120. The printing station 112 may include, in some embodiments, an inspection station 136 for inspecting a printed marking and a removal device 138 (e.g., kickout) for selectively removing any golf balls that do not pass a visual inspection test. In some embodiments, the printing station 112 may further include a curing apparatus for drying the printed ink.

Figure 3:
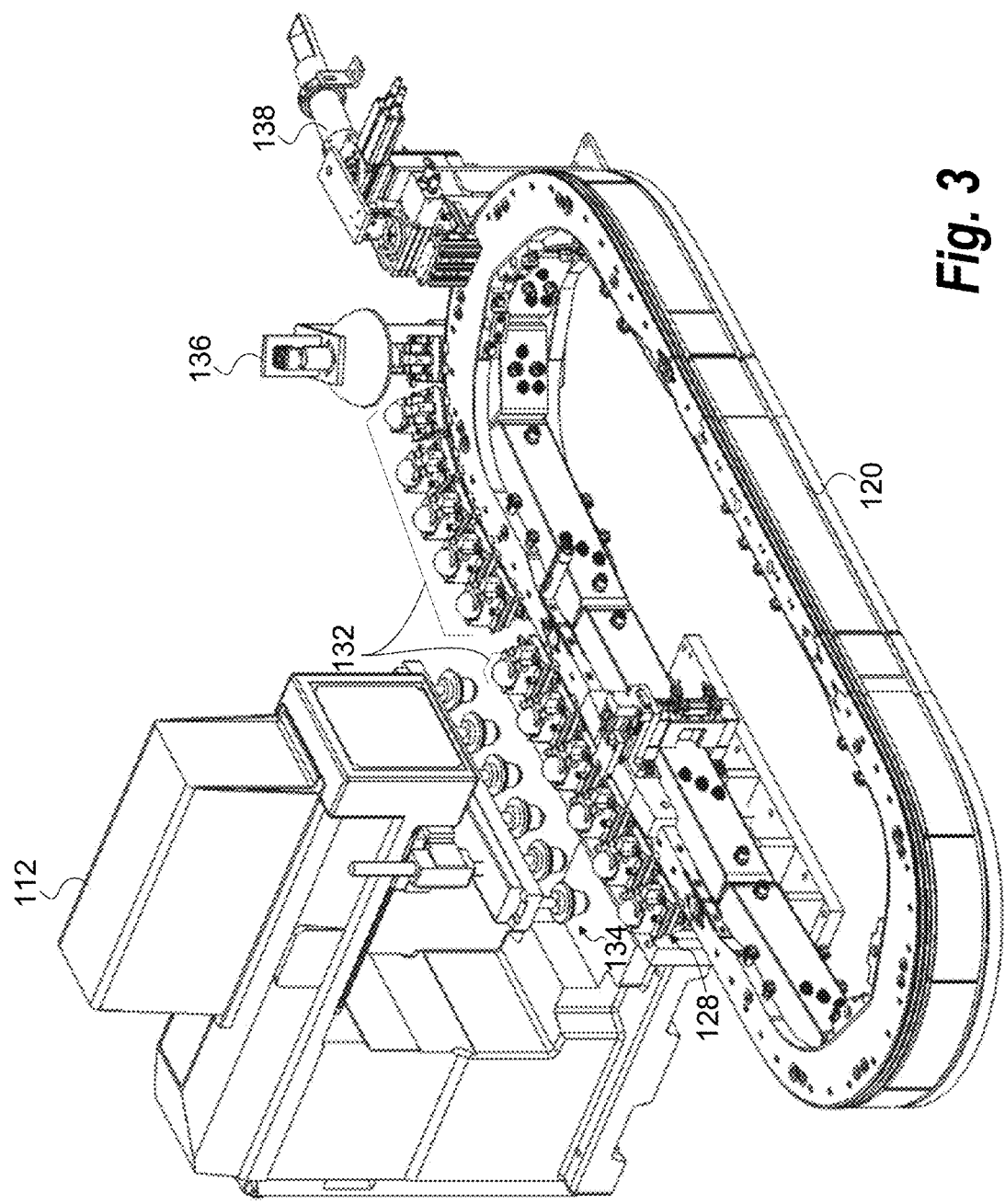
FIG. 3 is a perspective view of an exemplary printing station and associated station track, consistent with disclosed embodiments.

Returning to FIG. 3, in step 218, the shuttle 128 is returned to the primary track 116 and delivered to the sorting station 114 via the station track 122. For example, after the printing steps are completed via one or more printing stations 112, the golf ball may be satisfactory for offloading and/or packaging. In step 220, the offloading station 114 may remove a printed golf ball from the system 100. For example, the offloading station 114 may place a printed golf ball in a particular packaging system or location based on instructions from the control system 130.

The process 200 is an example method for processing a golf ball such that a particular type of golf ball is selected, delivered to a printing station in a desired orientation, printed according to desired specifications, and delivered to a target destination for packaging or further processing. The system 100 is configured such that this process may be continuously repeated and run simultaneously with many golf balls, even if the golf balls have different processing plans (e.g., different printing). As a result, a high-speed, high-throughput golf ball printing line may be realized.

FIG. 4 is a flowchart of an exemplary process 400 for processing multiple golf balls simultaneously in the system 100. In an exemplary embodiment, the control system 130 may be configured to provide instructions to one or more components of the system 100 to perform the steps of the process 400. For example, the control system 130 may be connected to one or more motors, controllers, switches, power sources, and the like, to control the movement of the plurality of shuttles 128 within the system 100.

In step 410, the control system 130 may receive a plurality of processing orders. Each processing order may include instructions for performing a manufacturing task on at least one golf ball. For example, a first processing order may include instructions for printing a first marking on one dozen golf balls. Another example may include a processing order for printing a second marking on another dozen golf balls. The processing order may include information identifying the station and/or stations 112 within the system 100 to perform the manufacturing task (e.g., which station or stations is prepared to print a desired marking).

In step 420, the control system 130 may generate processing plans based on the processing orders. For example, the control system 130 may convert the processing plans into concrete instructions for accomplishing the desired manufacturing task. In one example, the control system 130 may select a station 110 to identify and place the golf ball on a shuttle 128. The control system 130 may also select at least one station 112 to complete at least one processing step (e.g., printing, orienting, curing, painting, etc.). In some embodiments, the control system 130 may select multiple stations 112 to perform processing steps (e.g., printing at two different printing stations). The control system 130 may also select a station 114 to offload the golf ball.

In step 430, the system 100 may receive a plurality of golf balls from the golf ball delivery system 124. In some embodiments, the control system 130 may control the golf ball delivery system 124 to deliver a particular type of golf ball to a selected one of the stations 110. In step 440, the control system 130 is configured to control the system 100 to execute the processing plans on the onboarded golf balls through movement of the shuttles 128. In step 450, the finished golf balls are offloaded form the system 100 based on instructions from the control system 130.

According to some embodiments, the disclosed system 100 is applicable to quickly and efficiently process a plurality of golf balls simultaneously. The control system 130 is configured to generate processing plans and orchestrate timing of the movement of multiple shuttles 128 such that golf balls associated with different manufacturing tasks may be intermixed without losing track of processing orders. For example, a first, third, fifth, etc. golf ball through the system 100 may be oriented at a first station 110, printed at a first station 112, and offloaded a first station 114. A second, fourth, sixth, etc., golf ball through the system may be oriented at a second station 110, printed at a second station 112, and offloaded at a second station 114. The throughput/capacity of the system 100 can thus be customized based on the number of stations and tracks placed into the system and the complexity of the manufacturing tasks to be completed.

In another example, a golf ball of a first type may be delivered to a printing station for printing of a first marking while a golf ball of a second type may be delivered to the same or a different printing station for printing of a different second marking. The differently-printed golf balls may be delivered to different sorting stations and/or sorted into different packaging locations for packaging of similar golf balls. For example, one golf ball may receive a single printing stamp at one printing station, a second golf ball may receive multiple printing stamps at the same printing station, and another golf ball may receive multiple printing stamps at different printing stations within the transportation system. In this way, multiple different golf ball lots with different parameters may be processed simultaneously without collision or interruptions. The control system 130 may associate processing steps with a particular shuttle and provide instructions to track that shuttle throughout the transportation system for accurate final delivery and/or packaging.

The disclosed embodiments further include equipment, tools, adapters, etc. configured to enable the shuttles 128 to particularly carry a golf ball and, further, for the motion components to interact with the processing stations, such as a printing station.

Figure 6:
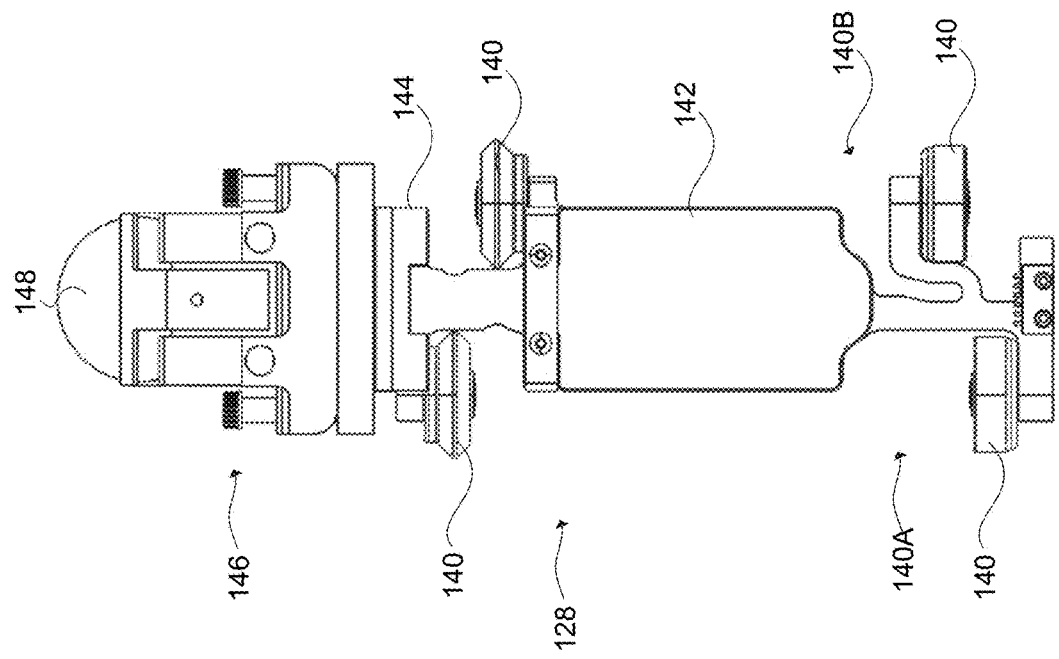
FIG. 6 is a front view of the shuttle of FIG. 5, consistent with disclosed embodiments.
Figure 5:
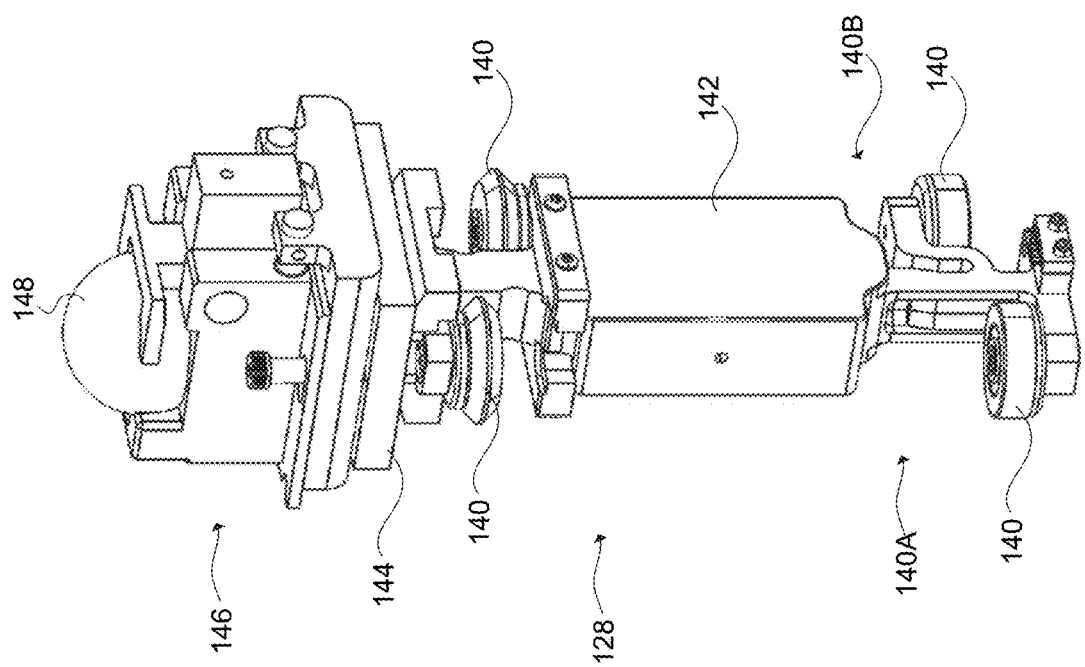
FIG. 5 is a perspective view of an exemplary shuttle configured to carry a golf ball through the transportation system of FIG. 1, consistent with disclosed embodiments.
Figure 10:
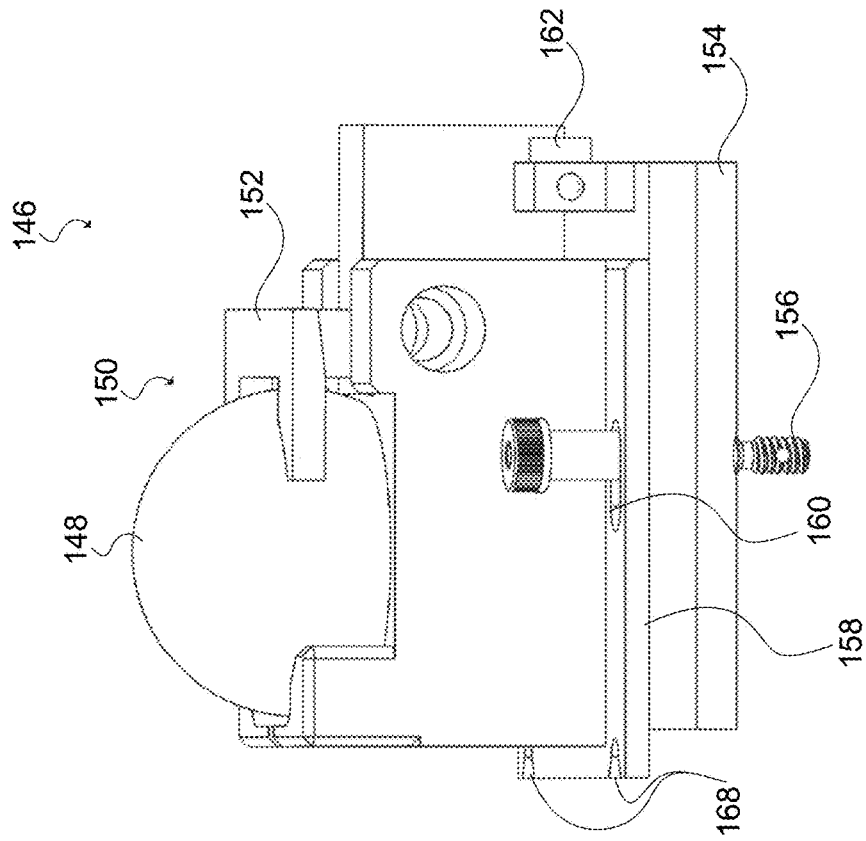
FIG. 10 is another perspective view of the golf ball holder of FIG. 7 in the locked position, consistent with disclosed embodiments.
Figure 9:
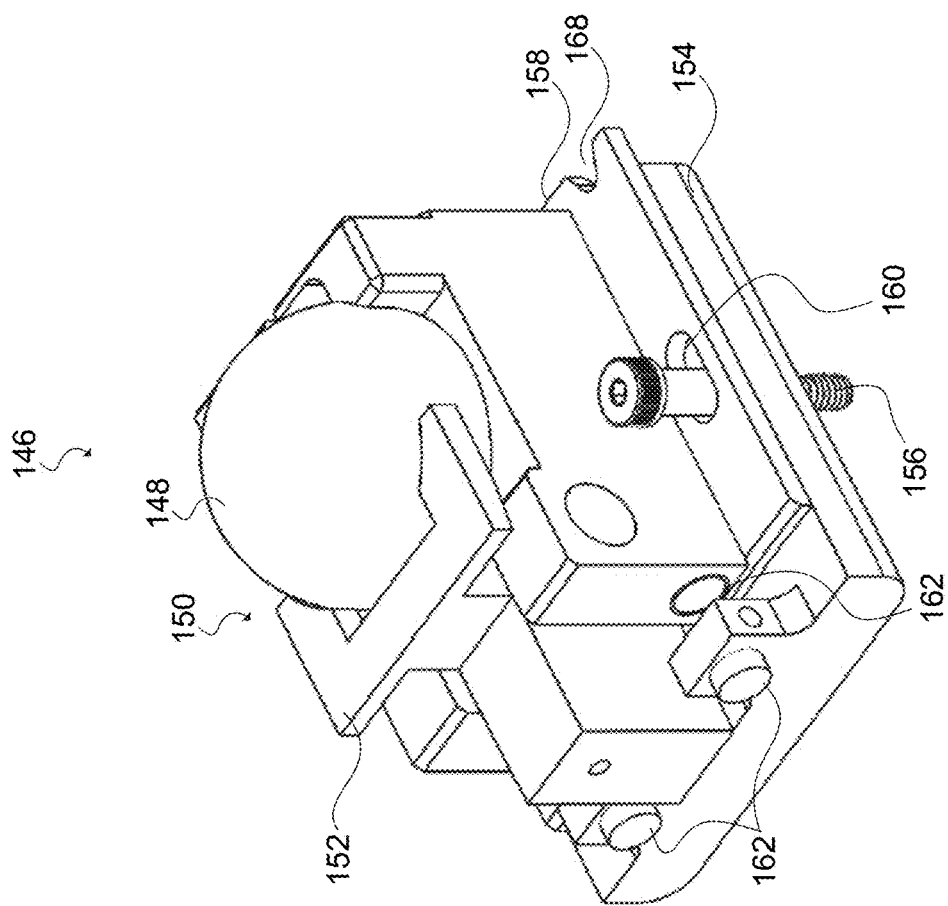
FIG. 9 is another perspective view of the golf ball holder of FIG. 7, including the lock mechanism in a locked position, consistent with disclosed embodiments.

FIGS. 5 and 6 include a perspective and side view of an exemplary shuttle 128 that may be used in conjunction with the transportation system 100 described herein. The shuttle 128 may include bearings 140 configured to enable movement of the shuttle 128 on the side of the primary track 116. The shuttle 128 may particularly include bearings 140 on two sides of a stanchion 142 to enable transfer of the shuttle 128 from one track to another (e.g., the shuttle 128 may ride on one side of a track and transfer to an adjacent track that comes in proximity to an opposite side of the shuttle). For example, the shuttle 128 may include a first side bearing 140A and a second side bearing 140B on opposing sides. The first side bearing 140A may be configured to ride the primary track 116 and the second side bearing 140B may be configured to ride on the plurality of station tracks 118, 120, 122. In this way, each shuttle 128 may be configured to switch between the primary track 116 and the station tracks 118, 120, 122 at high speeds even though the primary track is physically spaced from the station tracks 118, 120, 122. As the shuttle 128 arrives at positions in which the shuttle 128 is in proximity to both the primary track 116 and a respective one of the station tracks 118, 120, 122, the control system 130 can use a force (e.g., electromagnetic switch) to transfer the shuttle between the tracks. The shuttle 128 may further include a mount 144 attached to the stanchion 142 and configured to support a golf ball holder 146. The golf ball holder 146 is configured to receive and hold a golf ball 148 on the shuttle 128 such that the golf ball 148 can be moved through the transportation system 100.

FIGS. 7-10 further illustrate an exemplary embodiment of the golf ball holder 146. The golf ball holder 146 includes a holding clamp 150 for receiving and holding the golf ball 148 in place. The holding clamp 150 comprises a movable contact element 152 that is configured to move between a first position in which the golf ball 148 can be placed into the holding clamp 150 and a second position that contacts the golf ball 148 and inhibits movement of the golf ball 148. For example, the contact element 152 may be connected to another portion of the holding clamp 150 by a hinge.

The golf ball holder 146 further includes a mounting plate 154 configured to attach to the mount 144 of the shuttle 128 via one or more mounting pins 156. The mounting pins 156 may be fixed to the mount 144 but movable relative to the mounting plate 154 in a vertical direction. For example, the mounting plate 154 may be configured to move upward such that the golf ball holder is spaced vertically from the mount 144. The mounting pins 156 may include enlarged heads to inhibit complete removal of he golf ball holder 146.

In addition to the golf ball holder 146 being movable in a vertical direction relative to the mount 144, the holding clamp 150 is also relatively movable in a horizontal direction relative to the mounting plate 154 and mount 144 through attachment of a sliding plate 158. The sliding plate 158 includes at least one slot 160 configured to receive a portion of the mounting pin 156 and thereby enables the sliding plate 158, holding clamp 150, and golf ball 148 to move in a horizontal direction relative to the mounting plate 154 and underlying shuttle 128. The size of the slot 160 may determine a range of horizontal movement of the holding clamp 150.

The relative movement of the holding clamp 150 helps to enable proper positioning and registration of the golf ball 148 with respect to a processing station. For example, the golf ball holder 146 may be configured for vertical linear movement to enable the mounting plate 154 to rest on a support surface during a printing operation. In another example, the golf ball holder 146 may be configured for horizontal linear movement between an open position depicted in FIGS. 7 and 8 and a locked position depicted in FIGS. 9 and 10. In an exemplary embodiment, the golf ball holder 146 may be biased into the open position by a corresponding magnets 162 on the holding clamp 150 and the mounting plate 154. The golf ball holder 146 may be selectively movable into the locked position through application of a linear force on the holding clamp 150 and/or the sliding plate 158. For example, a sufficient linear force may be applied to break the attraction of the magnets 162 to move the golf ball holder 146 into a locked position. When the sufficient linear force is removed, the magnets 162 may return the golf ball holder 146 into the open position.

The vertically-movable mounting plate 154 and horizontally-movable sliding plate 158 may enable the golf ball holder 146 to move into a registration position during a manufacturing process. For example, the golf ball holder 146 may be moved vertically onto a support surface to remove 168a load from the underlying shuttle 128 and also moved into the locked position to place the golf ball into a position directly under a printing pad of a printing station.

Figure 11:
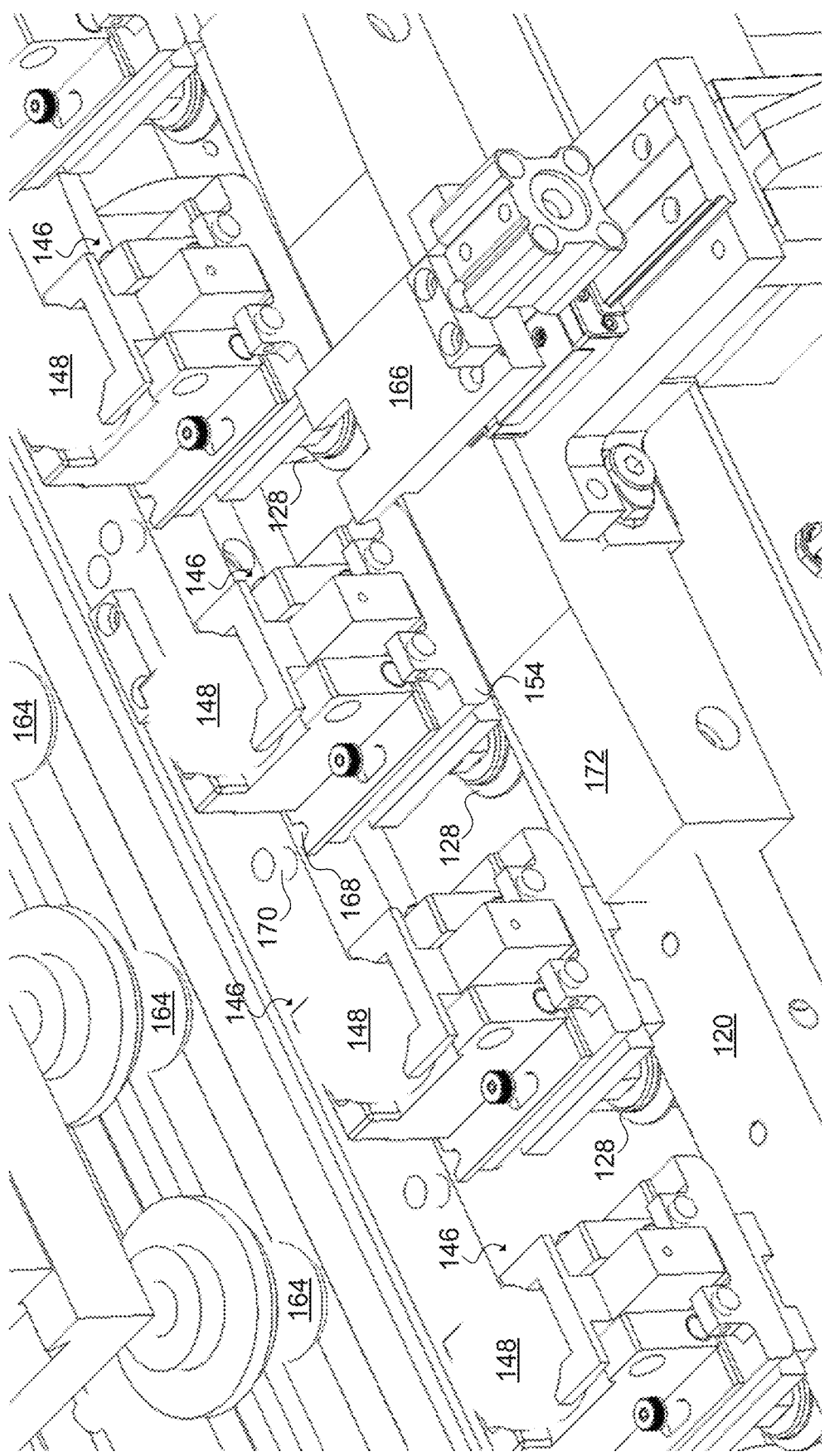
FIG. 11 is a close-up view of a portion of the printing station of FIG. 4, including a plurality of shuttles and golf ball holders being carried by the associated track, consistent with disclosed embodiments.

FIG. 11 is a close-up view of a plurality of golf ball holders 146 carried on corresponding shuttles 128 on a station track 120. The printing station 112 includes a plurality of printing pads 164 for printing on the golf balls 148 held by the golf ball holders 146. The printing station 112 may further include at least one push block 166 that is controllable (e.g., by the control system 130) to apply a linear force to push the golf ball holder 146 into the locked position (e.g., by sliding the sliding plate 158 forward and moving mounting pins 156 within the slots 160. The sliding plate 158 may further comprise one or more notches 168 configured to move and receive a corresponding stationary pin 170 on the printing station 112 to thereby lock the golf ball holder 146 into position with respect to the printing station 112 for precise and reliable printing by the printing pad 164. While only one is depicted, a plurality of adjacent push blocks 166 (e.g., one for each printing pad 164) may be provided to selectively lock a plurality of golf ball holders 146 in a printing position for simultaneous printing of on more than one golf ball 148.

The printing station 112 may also include a support rail 172 attached to the station track 120. The support rail 172 is raised relative to the station track 120 such that during movement of the shuttles 128 on the station track 120, each mounting plate 154 is configured to ride up onto the support rail 172, thereby moving the golf ball holder 146 upward with respect to the shuttle 128. The support rail 172 thereby provides support to the golf ball holder 146 such that a downward force onto the golf ball 148 (e.g., via the printing pads 164) is absorbed by the support rail 172. The support rail 172 may be sized to correspond to a single printing pad 164 or be extended under a plurality of printing pads 164. The support rails 172 thus helps to inhibit damage to the shuttles 128 that may otherwise be caused by the downward force of the printing pads 164.

The disclosed golf ball holder 146 may be considered an adapter for enabling a shuttle 128 to receive and hold a golf ball 148. The shuttle 128 is thus not limited to the embodiments shown and could include additional or alternative features for transporting a golf ball holder 146 on a track. While the golf ball holder 146 has been described in relation to a printing station 112, it should be understood that the disclosed embodiments are not limited to any particular manufacturing operation. For example, instead of pad printing, a station track may move a shuttle and golf ball holder into position for another golf ball manufacturing step, such as applying a spray paint or coating layer to an in-process golf ball. Such a golf ball holder may include similar features for enabling movement (i.e., locking) relative to the shuttle to position the golf ball with respect to the processing equipment.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

The invention claimed is:

1. A device for transporting a golf ball, comprising:
a shuttle configured to be attached to a track for movement along the track relative to a printing station; and
a golf ball holder attached to the shuttle, the golf ball holder configured to maintain an orientation of the golf ball,
wherein the golf ball holder comprises at least one plate configured to move the golf ball holder relative to the shuttle,
wherein the golf ball holder comprises a clamp for holding the golf ball, and
wherein the clamp comprises a movable contact element configured to move between an open position and a locked position.

2. The device of claim 1, wherein the at least one plate comprises a mounting plate attached to a mount of the shuttle by a mounting pin.

3. The device of claim 2, wherein the mounting pin is fixed to the mount and the mounting plate is vertically movable with respect to the mounting pin.

4. A device for transporting a golf ball, comprising:
a shuttle configured to be attached to a track for movement along the track relative to a printing station; and
a golf ball holder attached to the shuttle, the golf ball holder configured to maintain an orientation of the golf ball,
wherein the golf ball holder comprises at least one plate configured to move the golf ball holder relative to the shuttle,
wherein the at least one plate comprises a mounting plate attached to a mount of the shuttle by a mounting pin,
wherein the mounting pin is fixed to the mount and the mounting plate is vertically movable with respect to the mounting pin, and
wherein the at least one plate further comprises a sliding plate movable with respect to the mounting plate.

5. The device of claim 4, wherein the sliding plate comprises a slot configured to receive a portion of the mounting pin.

6. The device of claim 5, wherein the sliding plate comprises a lock feature for interacting with a corresponding feature on the printing station.

7. The device of claim 6, wherein the lock feature is a notch formed in the sliding plate.

8. A system for transporting a golf ball, comprising:
at least one track;
a printing station adjacent to the track for printing markings on the golf ball;
a shuttle configured to be attached to the track for movement along the track relative to the printing station; and
a golf ball holder attached to the shuttle, the golf ball holder configured to maintain an orientation of the golf ball,
wherein the golf ball holder comprises at least one plate configured to move the golf ball holder relative to the shuttle and the printing station,
wherein the at least one plate comprises a mounting plate attached to a mount of the shuttle by a mounting pin,
wherein the mounting pin is fixed to the mount and the mounting plate is vertically movable with respect to the mounting pin, and
wherein the printing station further comprises a support rail and the mounting plate is configured to move vertically away from the mount to be supported by the support rail.

9. The system of claim 8, wherein the golf ball holder comprises a clamp for holding the golf ball.

10. The system of claim 9, wherein the clamp comprises a movable contact element configured to move between an open position and a locked position.

11. A system for transporting a golf ball, comprising:
at least one track;
a printing station adjacent to the track for printing markings on the golf ball;
a shuttle configured to be attached to the track for movement along the track relative to the printing station; and
a golf ball holder attached to the shuttle, the golf ball holder configured to maintain an orientation of the golf ball,
wherein the golf ball holder comprises at least one plate configured to move the golf ball holder relative to the shuttle and the printing station, wherein the at least one plate comprises a mounting plate attached to a mount of the shuttle by a mounting pin, and wherein the at least one plate further comprises a sliding plate movable with respect to the mounting plate to move the golf ball holder between an open position and a locked position.

12. The system of claim 11, wherein the printing station further comprises a push block for applying a linear force to contact the golf ball holder and move the golf ball holder into the locked position through movement of the sliding plate with respect to the mounting plate.

13. The system of claim 12, wherein the sliding plate comprises a lock feature for interacting with a corresponding feature on the printing station in the locked position.

14. The system of claim 13, wherein the lock feature is a notch formed in the sliding plate and the corresponding feature is a stationary pin on the printing station.

15. A system for transporting a golf ball, comprising:
at least one track;
a printing station adjacent to the track for printing markings on the golf ball;
a shuttle configured to be attached to the track for movement along the track relative to the printing station; and
a golf ball holder attached to the shuttle, the golf ball holder configured to maintain an orientation of the golf ball,
wherein the golf ball holder comprises at least one plate configured to move the golf ball holder relative to the shuttle and the printing station, and
wherein the shuttle includes a plurality of bearings for riding on the track.

16. The system of claim 15, wherein the shuttle comprises bearings on opposing sides of a stanchion such that either side of the shuttle is configured to ride on the track, and thereby enabling side-to-side transfer of the shuttle from the track to another track.

* * * * *